United States Patent [19]

Bly et al.

[11] Patent Number: 4,478,618
[45] Date of Patent: Oct. 23, 1984

[54] DIESEL EXHAUST PARTICULATE TRAP WITH PLURAL FILTER TUBES

[75] Inventors: Kenneth B. Bly, Pontiac; Edward J. Chmiel, Warren; Ernest T. Martyniuk, Troy, all of Mich.

[73] Assignee: General Motors Corporation, Detroit, Mich.

[21] Appl. No.: 519,028

[22] Filed: Aug. 1, 1983

[51] Int. Cl.³ .................. B01D 39/20; B01D 46/24
[52] U.S. Cl. ........................................ 55/314; 55/502; 55/484; 55/505; 55/523; 55/DIG. 30; 210/323.2
[58] Field of Search ................................. 55/312–314, 55/350, 376, 378, 502, 505, 484, DIG. 30, 523; 60/311, 324; 422/174, 178, 180, 197; 210/323.2, 510.1

[56] References Cited

U.S. PATENT DOCUMENTS

| | | | |
|---|---|---|---|
| 3,841,841 | 10/1974 | Torosian et al. | 55/313 |
| 4,264,344 | 4/1981 | Ludecke et al. | 55/314 |
| 4,324,572 | 4/1982 | Erdmannsdörfer et al. | 55/DIG. 30 |
| 4,335,574 | 6/1982 | Sato et al. | 55/312 |
| 4,342,574 | 8/1982 | Fetzer | 55/378 |

FOREIGN PATENT DOCUMENTS

| | | | |
|---|---|---|---|
| 564265 | 4/1928 | Fed. Rep. of Germany | 55/484 |
| 3007639 | 9/1981 | Fed. Rep. of Germany | 60/311 |

*Primary Examiner*—David L. Lacey
*Attorney, Agent, or Firm*—Arthur N. Krein

[57] ABSTRACT

A particulate trap for removing particulates from the exhaust flow discharged from a diesel engine comprises a trap housing having an inlet connection and an outlet connection for the exhaust flow, an intermediate filter housing with a support plate positioned between one end of the filter housing and the outlet connection. The support plate is provided with a central one way valve controlled bypass passage extending therethrough and a plurality of closely spaced apart internally threaded apertures therethrough located around the bypass passage. A plurality of filter tubes are operatively supported within the filter housing by the support plate. Each of the filter tubes includes a perforated tube having an externally threaded outlet fitting fixed at one end thereof that is releasably threadingly engaged in an associate one of the apertures in the support plate whereby the perforated tube is supported in cantilever fashion. A closure cap is fixed at the opposite end of the tube with each closure cap being of an external diameter relative to the spacing of the threaded apertures whereby the cap will contact the closure caps on adjacent tubes whereby to support the cantilever ends of these tubes while still permitting axial expansion of the tubes. A coating of ceramic fibers is provided on each perforated tube so as to extend between the outlet fitting and the closure cap, the outside diameter of this coating of ceramic fibers being less than the external diameter of said associate closure cap.

2 Claims, 4 Drawing Figures

DIESEL EXHAUST PARTICULATE TRAP WITH PLURAL FILTER TUBES

This invention relates to diesel engine exhaust particulate traps and, in particular, to a filter trap having plural heat resistant particulate filter tubes supported therein.

DESCRIPTION OF THE PRIOR ART

It is known in the art to provide a diesel engine with an exhaust treatment system for the removal of particulates from the exhaust flow discharged from the engine. In one type of system, a particulate trap, which includes a trap housing with a particulate filter therein, is used to filter out and collect particulates from the exhaust gas stream. Such particulates consist largely of carbon particles that tend to plug the filter, thus restricting exhaust gas flow therethrough. Accordingly, after continued use of such a filter for a period of time dependent on engine operation and, of course, the effective surface flow area of the filter, it becomes desirable to effect regeneration of the particulate filter.

Restoration or regeneration of such a particulate filter has been accomplished, for example, by the use of a suitable auxiliary heating device that is operative to heat the particulates so as to effect combustion thereof. For example, either an electrical heating element or a fuel burner with an air-fuel nozzle and associated ignition device can be used and operated, as desired, to heat at least a portion of the particulate filter to the combustion temperature of the collected particulates so as to burn them off the filter surfaces and, accordingly, to thus reopen the flow paths therethrough to again permit normal flow of the exhaust gases through the filter. Regeneration of a particulate filter can also be enhanced by the addition of a suitable catalyst to the diesel fuel to be used by the engine, the catalyst being operative to substantially lower the ignition temperature of the particulates whereby the particulates can also be ignited by engine sparks.

It is known to form particulate filters from commercially available high-temperature resistant ceramic fiber materials which, as shown, for example, in U.S. Pat. No. 4,283,207 entitled Diesel Exhaust Filter-Incinerator issued Aug. 11, 1981 to Ernest T. Martyniuk, can be preformed into a suitable filter configuration, as desired. However, the use of the known particulate filters made of such ceramic fiber materials has been somewhat restricted up to this point in time due to either the limited usable flow surface area of such known filters or to the limited structural integrity of such a known filter in operational use.

It has also been proposed as disclosed, for example, in British Patent Application No. GB 2070972A published Sept. 16, 1981, to provide such filters in the form of filter tubes whereby the ceramic fiber filter material is supported on a perforated substrate or support tube, the construction being such that exhaust flow enters the filter tube in a radial direction so that the particulates are removed by the filter material and the clean exhaust leaves in an axial direction out through an open end of the support tube.

However, the known particulate traps using such filter tubes have had low filter surface areas and were too massive, if sufficient filter surface area was provided for, to permit their installation on modern passenger vehicles and, in addition, were expensive to manufacture and service.

SUMMARY OF THE INVENTION

The present invention relates to a particulate trap having a plurality of heat resistant particulate filter tubes mounted therein, each such filter tube including a perforated metal substrate or tube with a ceramic fiber filter material disposed thereon, the filter tubes being structurally mounted in a trap housing so that exhaust gas will enter the filter tube in a radial direction and leave in an axial direction, the tubes being positioned so that a large total usable filter area is available and whereby during incineration of particulates trapped on a filter tube, the heat generated thereby will assist in the propagation of a burning flame front to adjacent filter tubes.

Accordingly, a primary object of the invention is to provide an improved diesel exhaust particulate trap having a tight bundle of filter tubes mounted therein to provide a large surface area for the collection of particulates from the exhaust gas discharged from a diesel engine.

Another object of the invention is to provide an improved diesel particulate trap having plural filter tubes mounted therein for use in the exhaust cleaner system for a diesel engine, the filter tubes being adapted for the outside-in flow of exhaust gases and being supported relative to each other in a manner so as to facilitate the incineration of particulates trapped thereby.

For a better understanding of the invention, as well as other objects and further features thereof, reference is had to the following detailed description of the invention to be read in connection with the accompanying drawings.

DESCRIPTION OF A PREFERRED EMBODIMENT

Figure 1:
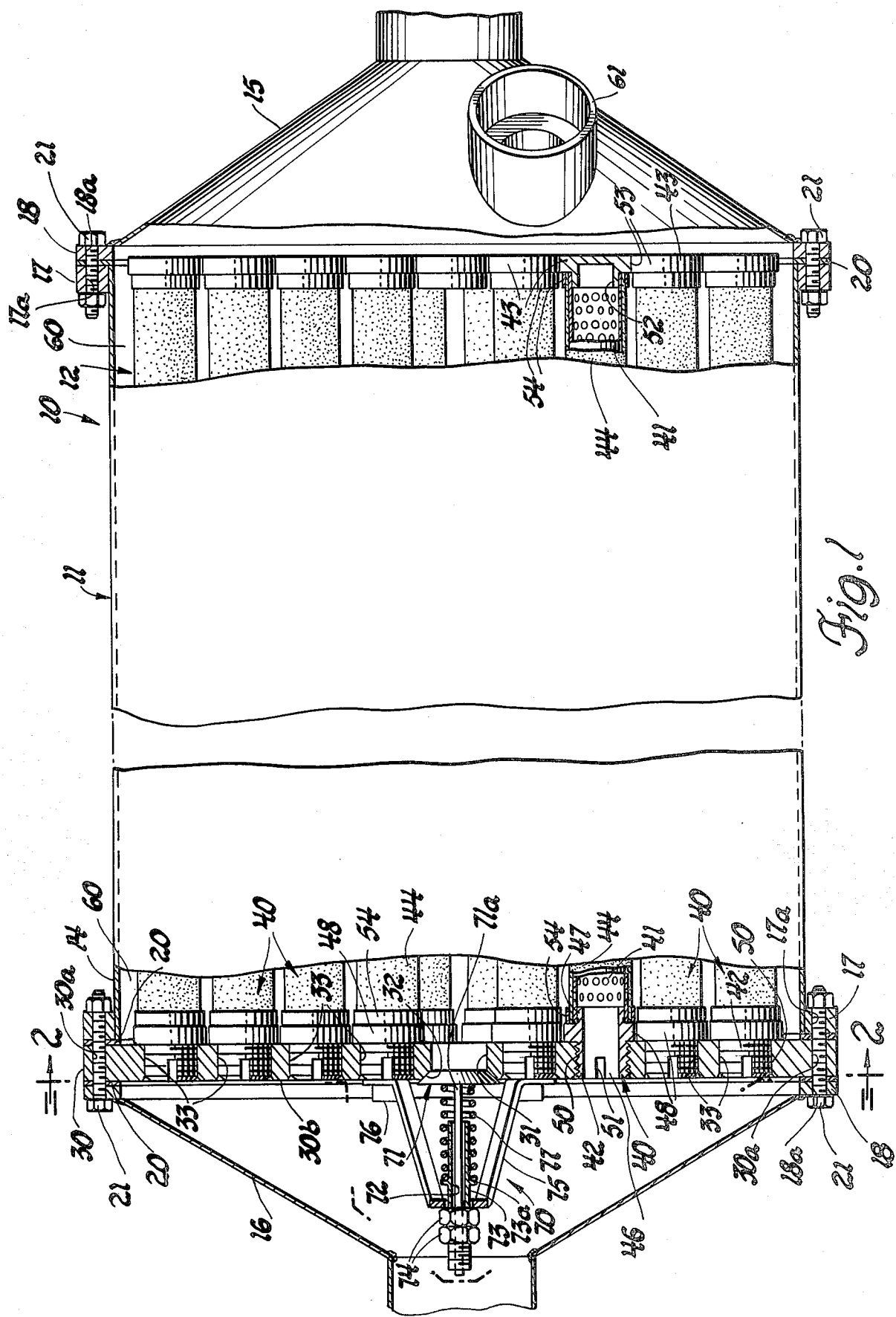
FIG. 1 is a pictorial view of a particulate trap with plural filter tubes mounted therein, in accordance with the invention, for use with a diesel engine, parts of the trap housing and filter tubes being partially cut away to show structural details thereof.

Referring first to FIG. 1, there is shown an exhaust treatment apparatus in the form of a particulate trap, generally designated 10, which is adapted to receive exhaust gas discharged from a diesel engine, not shown. The filter trap 10, includes a trap housing 11 with a particulate filter assembly 12, in accordance with the invention to be described in detail hereinafter, operatively supported therein.

The trap housing 11, as best seen in FIG. 1, includes a tubular shell 14, preferably formed of sheet metal and having a generally elongated and flattened oval configuration, with an inlet connector 15 and an outlet connector 16 disposed at opposite ends thereof to provide means for connecting the filter trap in the exhaust system of a diesel engine powered vehicle so as to provide for the passage of exhaust gases into and out of the trap housing 11.

In the construction illustrated, each end of the shell 14 is provided with a radial outward extending flange 17 having a plurality of equally spaced apart internally threaded apertures 17a therein. As shown in FIG. 1 both the outboard end of the inlet connector 15 and the inboard end of the outlet connector 16 are each provided with similar flanges 18 having corresponding fastener receiving apertures 18a. Thus both the inlet connector 15 and outlet connector 16 can thus be operatively connected to the shell 14 with a suitable gasket 20 or gaskets 20 sandwiched therebetween, by means of screws 21, it being noted that the support plate 30 portion, to be described in detail hereinafter, of the filter assembly 12 is also sandwiched between the outlet connector 16 and shell 14.

Referring now to the particulate filter assembly 12, this filter assembly, in accordance with the invention, includes a support plate 30 with spaced apart internally threaded apertures 33 therethrough, each such threaded aperture being adapted to threadingly receive the threaded end of a filter tube 40, to be described in detail hereinafter, the arrangement being such that a bundle of such filter tubes 40 are supported by the support plate 30 in cantilever fashion.

Figure 2:
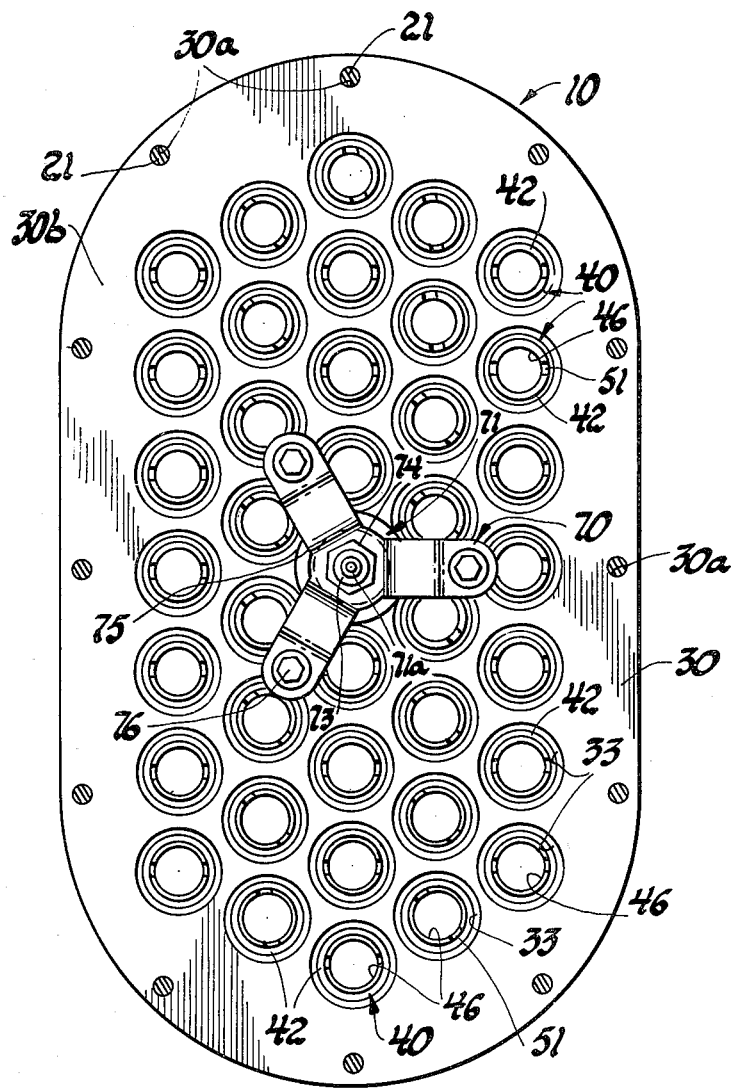
FIG. 2 is a section view of the particulate trap of FIG. 1 taken along line 2—2 of FIG. 1.

The support plate 30, this plate, as best seen in FIG. 2, is of suitable thickness and of an external configuration corresponding to the external shape and size of the flanges 17 encircling the shell 14 and is provided with fastener receiving apertures 30a located to align with the apertures 17a in the associate flange 17 at the outlet end of the shell 14 and the apertures 18a in the flange 18 of the outlet connector 16.

In the construction shown, the support plate 30 is also provided with a central bypass passage 31, that is encircled by an annular valve seat 32 at its outboard end, and is provided with the plurality of equally spaced apart internally threaded apertures 33. In the illustrated embodiment, thirty-eight such apertures 33 are provided, with the apertures encircling the bypass passage 31 being equally spaced apart relative to the axis of the bypass passage 31.

In a particular application, the axes of apertures were aligned in rows inclined at an angle of 30° to a vertical axis of the support plate 30, with reference to FIG. 2, that extends through the axis of the bypass passage 31 and with the central row passing through the axis of this bypass passage. By way of an example and for the purpose of discussion hereinafter, the bypass passage 31 and the apertures 33 were spaced apart a distance of 25.4 mm relative to each other.

Referring now to the filter tubes 40 each such filter tube 40 includes a tubular substrate in the form of a perforated support tube 41, an externally threaded outlet fitting 42 at one end of the support tube, the outlet end in terms of the exhaust flow path, a closure cap 43 at the opposite end of the support tube and, a ceramic fiber filter 44 material encircling the exterior of support tube along its exposed axial extent between outlet fitting 42 and closure cap 43, as described hereinafter.

Figure 3:
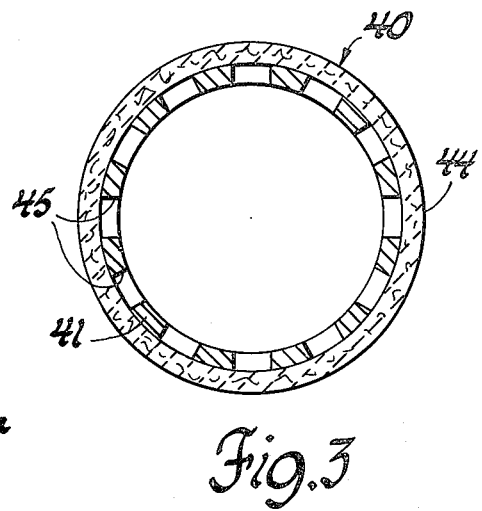
FIG. 3 is a sectional view of the substrate and filter material portion of a filter tube, per se; and, FIG. 4 is a perspective view of a portion of a filter tube, per se, with the filter material removed from a portion thereof.
Figure 4:
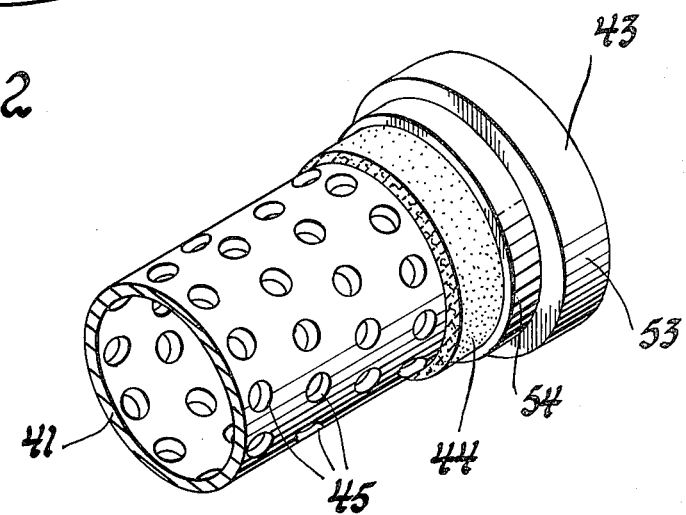

As described, each filter tube 40 thus includes a tubular substrate in the form of a support tube 41, of suitable material such as stainless steel, that is provided with spaced apart perforations or openings 45 through the walls thereof, which in the construction shown in FIGS. 1, 3 and 4 are provided along the full axial extent of the support tube.

Now in accordance with a feature of the invention, each support tube 41 at one end thereof, the outlet or left hand end with reference to FIG. 1, is fixed as by welding, to an externally threaded outlet fitting 42 and at its opposite end is fixed, in a similar manner, to a closure cap 43 the details of which are to be described in detail hereinafter.

As best seen in FIG. 1, each outlet fitting 42 is of stepped external circular configuration and is provided with a bore 46 therethrough. As shown, one end of each outlet fitting 42 is provided at one end with an annular inboard shank portion 47 of an external diameter to receive one end of its associate support tube 41, an intermediate abutment flange portion 48 and, at its other or outboard end with an externally threaded shank portion 50. In the construction shown, each outlet fitting 42 is also provided with, in effect, a suitable screwdriver slot 51 to permit torque down of the outlet fitting to the support plate 30.

Each closure cap 43 is provided with a reduced diameter portion 52 of an external diameter to receive the opposite end of a support tube 41 and an enlarged external diameter portion 53 that is preselected, as desired, in a manner and for purposes to be described in detail hereinafter.

In addition, and as best seen in FIG. 1, a metal ring 54 is fixed, as by welding or brazing, to each end of the support tube 40 whereby to cover over the openings 45 in this tube where it is secured to the shank portion 47 and portion 52 of the outlet fitting 42 and closure cap 43, respectively.

As previously described, each support tube 41 is used to support a suitable ceramic fiber filter 44 material thereon that serves as the actual filter material to effect removal of diesel particulates from the exhaust flow of an engine.

The individual filter support tubes 41 are coated with commercial ceramic fibers in a suitable known manner. In a particular embodiment, the ceramic fiber was of alumina-silica in the general order of 2–3 microns in diameter. The fiber length thereof was typically in the range of 0.25–0.50 inches in length, but can be in the order of 3 to 4 inches in length under controlled conditions of deposition.

As is known in the art, the process of deposition is by acretion. The ceramic fibers are suspended in a water slurry containing suitable known organic and inorganic binders. The support tubes 41 are then immersed in the slurry bath and a vacuum is applied on the inside of each support tube to pull the water portion of the slurry through the perforated metal tube wall thereof. The ceramic fibers are accumulated on the exposed surface of the associate perforated support tube until the desired thickness of the coating has been obtained. The fiber layer in this application was typically 0.020–0.080 inches thick. Thus, as best seen in FIG. 1, the external diameter of the ceramic fiber filter 44 material encircling a support tube 41 is less than the external diameter of the flange portion 48 of an associated outlet fitting 42 and of the portion 53 of an associate closure cap 43.

The support tubes are then removed from the slurry bath and are subsequently dried before assembly to the support plate 30. The ceramic fibers are bonded together during the high temperature operation of the filter with 1% to 5% colloidal silica or other suitable inorganic high temperature binders.

As will now be apparent, each aperture 33 is adapted to threadingly receive the externally threaded shank portion 50 of the outlet fitting 42 of an associate filter tube 40 whereby this filter tube 40 is supported in cantilever fashion by the support plate 30. However, in accordance with a feature of the invention, each closure cap 43 has the enlarged diameter portion 53 thereof of an external diameter corresponding to the distance between centers of the apertures 33. That is, with reference to the example described hereinabove, the outside diameter of the portion 53 of each of the closure caps 43 would also be 25.4 mm. With this arrangement, each closure cap 43 will thus contact the closure caps of next adjacent filter tubes 40 whereby these closure caps can act to help support the otherwise free ends of the associate filter tubes 40 while still permitting axial expansion of these filter tubes 40. That is, each filter tube 40, in effect, is only axially fixed at one end as by the threaded connection of its associate outlet fitting 42 to the support plate 30.

Now as best seen in FIG. 1, the support plate 30 is sandwiched between the flange 18 of the outlet connector 16 and the flange 17 on the downstream end of the shell 14 so that the filter tubes 40 extend into and substantially through the interior exhaust chamber 60 defined by the internal surface of shell 14. As shown, a clearance exists between the outer surface of the filter tubes 40 and the interior surface of the shell 14 and, of course, between the filter material 44 of adjacent filter tubes 40 so as to define flow paths within the exhaust chamber 60 for the incoming exhaust gas.

In operation, exhaust gas as from a diesel engine, flowing through the inlet connector 15 into the exhaust chamber 60 can then flow radially through the filter material 44 and apertures 45 into an associate support tube 41, the clean exhaust gas then flowing axially through the support tube 41 and out through the bore passage 46 in the outlet fitting 42 into the outlet connector 16 for discharge, as into the atmosphere. During this exhaust gas flow through the ceramic fiber filter 44 material, particulates will be trapped in and on the filter material.

Such particulates consist largely of carbon particles that tend to plug the filter, thus restricting gas flow therethrough. Accordingly, after continued use of such filters for a period of time, dependent on engine operation, it becomes desirable to effect regeneration of the filters. For this purpose, the inlet connector 15, in the construction illustrated, is provided with a secondary duct opening 61 in which a suitable ignitor, such as a fuel burner, not shown, can be mounted so as to supply additional heat, as necessary to initiate combustion of the particulates.

Flow through the bypass passage is controlled by a suitable one-way relief valve, generally designated 70. In the construction shown, the relief valve 70 includes a valve 71 having a stem 71a slidably supported in the bore 72 of a valve guide tube 73. The valve guide tube 73 is adjustably fixed, as by nuts 74 to a tripod support 75, it being noted that one of the nuts 74 is secured as by welding to this support. As shown, the tripod support 75 is mounted, as by screws 76, to the outboard face 30b of the support plate 30 in position whereby the head of the valve 71 is movable between open and closed positions relative to the valve seat 32. A coil spring 77 is operatively associated with the valve 71 and an external wrenching head flange 73a, the valve guide tube 73 to normally bias the valve to its closed position.

The force of the coil spring 77, is preselected as desired, to permit opening of the valve 71 so as to prevent excessive backpressure on an associate engine in the case there is a delay in affecting a regeneration of the filter material on the filter tubes 40. This relief of excessive backpressure would also prevent damage to these filter tubes.

The subject particulate trap with the filter tubes 40 mounted therein as disclosed, provides a filter structure with sufficient filter surface area so that it is capable of collecting 98% of the diesel particulate solid emissions discharged from an engine.

With the arrangement shown, when metallic catalyst type additives are used in the fuel, the particulates can be readily ignited with engine sparks, pin point fuel ignitors, electric arc ignitors and/or electric resistance heater ignitors since the burning of the particulate (carboneous) can then propagate from even a small (less than 1 mm dia.) ignition point. The ceramic fibers of the filter material will act as an insulator to prevent extracting the heat of combustion by the high mass perforated metal substrates or support tubes 41.

This particulate trap with its compact filter tubes 40 is capable of being installed in the available space of current production diesel powered passenger vehicles.

The filter tube 40 mounting arrangement shown, permits the individual support tubes to be individually coated and then installed to the support plate 30.

The closure cap 43 structure allows the filter tube bundle to be, in effect, self-supporting on the inlet end thereof, while still permitting axial expansion of the individual filter tubes.

The compact mounting arrangement shown, wherein the filter tubes are assembled in a tight bundle, will permit more complete regeneration of the filter material on these tubes since the particulate burning can more easily propagate from filter tube to filter tube.

While the invention has been described with reference to the structure disclosed herein, it is not confined to the specific details set forth, since it is apparent that various modifications and changes can be made by those skilled in the art. This application is therefore intended to cover such modifications or changes as may come within the purposes of the improvements or scope of the following claims.

The embodiments of the invention in which an exclusive property or privilege is claimed are defined as follows:

1. A particulate trap for removing particulates from the exhaust flow discharged from a diesel engine comprising a trap housing having an inlet connection and an outlet connection for the exhaust flow, an intermediate filter housing and, a support plate operatively positioned between one end of said filter housing and said outlet connection, said support plate having a central one way valve controlled bypass passage extending therethrough and a plurality of equally spaced apart internally threaded apertures therethrough located around said bypass passage; and, a plurality of filter tubes operatively supported within said filter housing by said support plate, each of said filter tubes comprising a perforated tube having an externally threaded outlet fitting fixed at one end thereof that is releasably threadingly engaged in an associate one of said internally threaded apertures in said support plate whereby each of said perforated tubes is supported in cantilever fashion from said support plate, a closure cap fixed at the opposite end of each of said tubes, each of said closure caps being of an external diameter relative to the spacing of said internally threaded apertures so that said closure caps will contact adjacent ones of said closure caps whereby said closure caps act as supports for the cantilever ends of said perforated tubes while still permitting axial expansion of said tubes and, a coating of ceramic fibers on said perforated tube extending between said outlet fitting and said closure cap, the outside diameter of said coating of ceramic fibers being less than the external diameter of each of said closure caps.

2. A particulate trap for removing particulates from the exhaust flow discharged from a diesel engine, said particulate trap comprising a trap housing having an intermediate filter housing with an inlet connection at one end thereof and an outlet connection connected thereto at its opposite end with a support plate operatively positioned between said opposite end of said filter housing and said outlet connection, said support plate having a central one way valve controlled bypass passage extending therethrough and a plurality of equally spaced apart internally threaded apertures therethrough located around said bypass passage; and, a plurality of filter tubes operatively supported within said filter housing by said support plate, each of said filter tubes comprising a perforated tube having an externally threaded outlet fitting fixed at one end thereof that is threadingly engaged in an associate one of said apertures in said support plate whereby said perforated tube is supported in cantilever fashion from said support plate, a closure cap fixed to the opposite end of each said tubes, each of said closure caps being of an external diameter relative to the spacing of said apertures whereby said closure caps will contact adjacent ones of said closure caps so that each of said closure caps on said filter tubes will act as a support for the cantilever ends of adjacent said filter tubes while still permitting axial expansion of said filter tubes and, a coating of ceramic fibers on each said perforated tube extending between said outlet fitting and each said closure caps, the outside diameter of said coating of ceramic fibers being less than the external diameter each of said closure caps.

* * * * *